US010408614B1

(12) United States Patent
DeLorenzo et al.

(10) Patent No.: US 10,408,614 B1
(45) Date of Patent: Sep. 10, 2019

(54) LEVELING SYSTEM

(71) Applicants: Joseph Frank DeLorenzo, Torrance, CA (US); Randall Takeshi Takaki, Torrance, CA (US)

(72) Inventors: Joseph Frank DeLorenzo, Torrance, CA (US); Randall Takeshi Takaki, Torrance, CA (US)

( * ) Notice: Subject to any disclaimer, the term of this patent is extended or adjusted under 35 U.S.C. 154(b) by 0 days.

(21) Appl. No.: 16/270,507

(22) Filed: Feb. 7, 2019

Related U.S. Application Data

(60) Provisional application No. 62/628,861, filed on Feb. 9, 2018.

(51) Int. Cl.
*G08B 5/22* (2006.01)
*G01B 11/30* (2006.01)

(52) U.S. Cl.
CPC ................ *G01B 11/306* (2013.01)

(58) Field of Classification Search
CPC ............... G01B 11/306; B60Q 3/06
USPC ........ 340/815.45, 815.65, 384.1, 686.2, 618, 340/624, 620
See application file for complete search history.

(56) References Cited

U.S. PATENT DOCUMENTS

| 3,894,230 | A | | 7/1975 | Rorden et al. |
| 4,756,617 | A | * | 7/1988 | Cain ................ G01C 15/004 356/141.3 |
| 4,820,041 | A | | 4/1989 | Davidson et al. |
| 5,579,102 | A | | 11/1996 | Pratt et al. |
| 9,521,236 | B2 | * | 12/2016 | Del Toro ............ H04M 1/7253 |
| 2001/0023766 | A1 | | 9/2001 | Ohtomo et al. |
| 2003/0000355 | A1 | | 1/2003 | Butler et al. |
| 2013/0276315 | A1 | | 10/2013 | Kahle |
| 2018/0335304 | A1 | * | 11/2018 | Seitz ..................... G01C 3/08 |

OTHER PUBLICATIONS

International Search Report and Written Opinion in International application No. PCT/US19/17120 dated Apr. 29, 2019.

* cited by examiner

*Primary Examiner* — Tai T Nguyen
(74) *Attorney, Agent, or Firm* — Knobbe Martens Olson & Bear LLP

(57) ABSTRACT

A leveling system for identifying high and low areas of a surface relative to a reference plane to within a desired tolerance. A light source emits light in a level plane at a height above the reference plane. Several depth-indicator targets rest on the surface to be measured in an upright manner and are struck by the light in the level plane. Each of the depth-indicator targets indicates, based on color, whether the surface at that surface location is high, low, or level based on the location at which the light strikes the depth-indicator target. The color emitted by the target can be from a fluorescing layer of the target or light signals on the target controlled by a light-detecting receiver. A user can then quickly identify problem areas of the surface that need to be adjusted (e.g., raised or lowered).

20 Claims, 18 Drawing Sheets

LEVELING SYSTEM

PRIORITY

This application claims the benefit of U.S. Provisional App. No. 62/628,861 filed on Feb. 9, 2018, the entirety of which is hereby incorporated by reference and should be considered a part of this specification.

BACKGROUND

Field

This disclosure is directed to systems, apparatus, and methods for leveling a surface for purposes of construction, flooring, cabinetry, surveying and similar activities.

Related Art

In the stone slab industries (e.g., granite, quartz, marble, ceramics, and other types of natural and synthetic stone tiles, slabs, countertops, etc.), the importance of accurate and robust installations is paramount. Cracking, shifting or chipping of the stonework can be expensive and time-consuming to correct. In addition, modern large-format slabs used in flooring installations are thinner (e.g., ¼ inches thick or less) and/or larger (e.g., 15 inches on one side or larger) than was common previously. Accordingly, installations have become increasingly technically difficult and require a higher degree of precision to prevent damage to the large-format slabs both during and after installation. The accuracy of the pre-leveling of the flooring surface can determine whether the installed slabs will crack after installation.

SUMMARY

A leveling system for identifying high and low areas of a surface relative to a reference plane to within a desired tolerance. The system includes a light source. The light source emits light in a level plane at a height above the reference plane. A plurality of depth-indicator targets resting upright on the surface, each of the depth-indicator targets including a target body. The target body includes a first layer of fluorescent material in a first color, a second layer of fluorescent material in a second color, and a third layer of fluorescent material in a third color. The first, second, and third layers are coupled together and stacked vertically with the first layer located above the second layer and third layer located beneath the second layer.

The depth-indicator targets are each placed at a plurality of measurement locations on the surface. The light emitted from the light source in the level plane strikes each of the depth-indicator targets at the first, second or third layer and causes the struck layer to fluoresce. The first layer fluorescing in the first color indicates a low area of the surface at the measurement location relative to the reference plane. The second layer fluorescing in the second color indicates a level area of the surface at the measurement location relative to the reference plane. The third layer fluorescing in the third color indicates a high area of the surface at the measurement location relative to the reference plane.

According to another aspect of the system, the first, second, and third colors are different.

According to another aspect of the system, the first and third layers each have a thickness equivalent to the desired tolerance.

According to another aspect of the system, the second layer has a thickness equivalent to the desired tolerance.

According to another aspect of the system, the thickness is ⅛ inches (3.18 mm).

According to another aspect of the system, the target body includes a fourth layer of fluorescent material stacked above the first layer and a fifth layer of fluorescent material stacked below the third layer.

According to another aspect of the system, a top surface of the second layer is coupled with a bottom surface of the first layer and a bottom surface of the second layer is coupled with a top surface of the third layer.

According to another aspect of the system, the first layer has a first diameter and the second layer has a second diameter, greater than the first diameter, and the third layer has a third diameter greater than the second diameter.

According to another aspect of the system, the target body is coupled with a support that raises the second layer to the height of the level plane above the surface.

According to another aspect of the system, the target body includes at least one upper conical-shaped layer.

According to another aspect of the system, the target body includes a self-leveling base.

According to another aspect of the system, the self-leveling base includes a weighted, dome-shaped protrusion.

A leveling target for use with a planar light source to identify offset areas of a surface relative to a reference plane. The target includes a target body. The target body includes a first layer of fluorescent material in a first color, a second layer of fluorescent material in a second color, and a third layer of fluorescent material in a third color. The first, second, and third layers are coupled together with the first layer on a first side of the second layer and the third layer on with a second side of the second layer.

When struck by a planar light source, the first layer fluoresces in the first color and indicates a negative offset area of the surface at the measurement location relative to the reference plane, the second layer fluoresces in the second color and indicates a level area of the surface at the measurement location relative to the reference plane or the third layer fluoresces in the third color and indicates a positive offset area of the surface at the measurement location relative to the reference plane.

According to another aspect of the target, the target body includes a self-leveling base.

According to another aspect of the target, the first, second, and third colors are different.

According to another aspect of the target, the second layer has a thickness equivalent to a desired tolerance for the offset areas of the surface.

According to another aspect of the target, the target body includes one of a suction cup, tack, and a magnet for attachment with the surface.

A leveling system for identifying high and low areas of a surface relative to a reference plane to within a desired tolerance includes a light source. The light source emits light in a level plane at a height above the reference plane. A plurality of depth-indicator targets rest on the surface. Each of the depth-indicator targets includes a target body. The target body has an upper surface and a bottom surface rest on the surface. A high indicator light in a first color is on the target body. A level indicator light in a second color is on the target body. A low indicator light in a third color is on the target body.

A light receiver receives the light emitted from the light source in the level plane. The depth-indicator targets are each placed at a plurality of measurement locations on the surface and the light emitted from the light source strikes each of the depth-indicator targets at the light receiver. This causes one of the high, level, and low indicator lights to turn on. The high indicator light in the first color corresponds to the light source striking low on the light receiver and indicates a high area of the surface at the measurement location relative to the reference plane. The level indicator light in the second color corresponds to the light source striking level on the light receiver and indicates a level area of the surface at the measurement location relative to the reference plane. The low indicator light in the third color corresponds to the light source striking high on the light receiver and indicates a low area of the surface at the measurement location relative to the reference plane.

According to another aspect of the system, the bottom surface includes a self-leveling base.

According to another aspect of the system, the self-leveling target body is rounded and weighted to orient the target body in an upright position on the surface.

According to another aspect of the system, the target body includes a level indicator to indicate whether the target body is in an upright position on the surface.

According to another aspect of the system, target body further includes a speaker for emitting a sound based on where the light plane strikes the light receiver.

According to another aspect of the system, the light receiver includes a high receiver coupled with the high indicator light, a level receiver coupled with the level indicator light, and a low receiver coupled with the low indicator light.

According to another aspect of the system, the target body includes a battery for powering the indicator lights.

According to another aspect of the system, the target body includes a photovoltaic cell for powering the indicator lights.

According to another aspect of the system, the photovoltaic cell is tuned to a frequency of the light emitted by the light source.

A powered target includes an upper portion and a lower portion. The upper and lower portions are spaced apart to define a gap therebetween. The upper portion is adjustable with respect to the lower portion to adjust a width of the gap. The lower portion rests on a surface. A light receiver is disposed within the gap and detects a light plane. At least one indicator light indicates whether the light plane strikes the light receiver to determine levelness of the surface.

According to another aspect of the target, the gap is adjustable between 1/32 inches (0.794 mm) and 1/4 inches (6.35 mm).

According to another aspect of the target, a spacer is attachable with the upper or lower portions to narrow the gap.

According to another aspect of the target, an adjustment base adjusts a height of the powered target above the surface and the adjustment base includes a sensor for measuring the height of the sensor above the surface. The height is displayed on a user interface.

According to another aspect of the target, a light reflecting member is adjacent to the gap. The light reflecting member deflects the light plane into a second light receiver.

According to another aspect of the target, a controller receives a first signal containing a first parameter from the light receiver and a second signal containing a second parameter from the second light receiver and compares the first and second parameters. Based on the comparison, the target indicates whether the surface is level to within a desired tolerance. A high ratio of the first parameter to the second parameter corresponds to the surface being within tolerance. A low ratio of the first parameter to the second parameter corresponds to the surface not being within tolerance.

A light source includes a body above a base; the base is coupled with the body by a height adjustment mechanism. The body includes a rotatable light emitter for emitting a light plane. The height adjustment mechanism has a sensor for measuring a height of the emitted light plane. The height is displayed on a user interface as measured by the sensor.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION

Figure 10A:
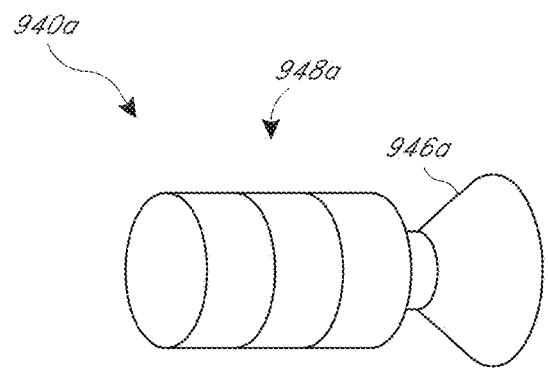
Figure 10B:
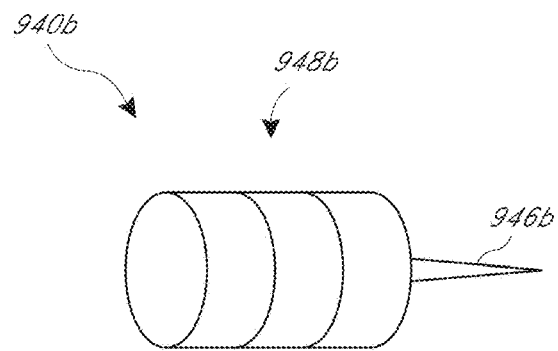
Figure 10C:
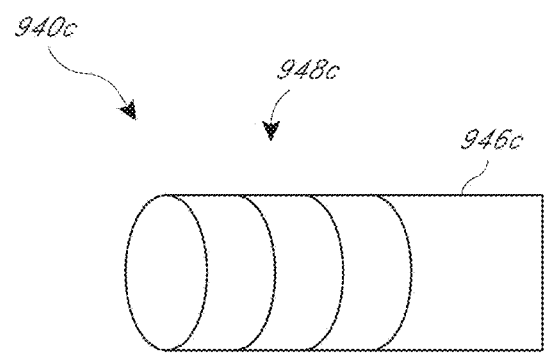
Figure 11:
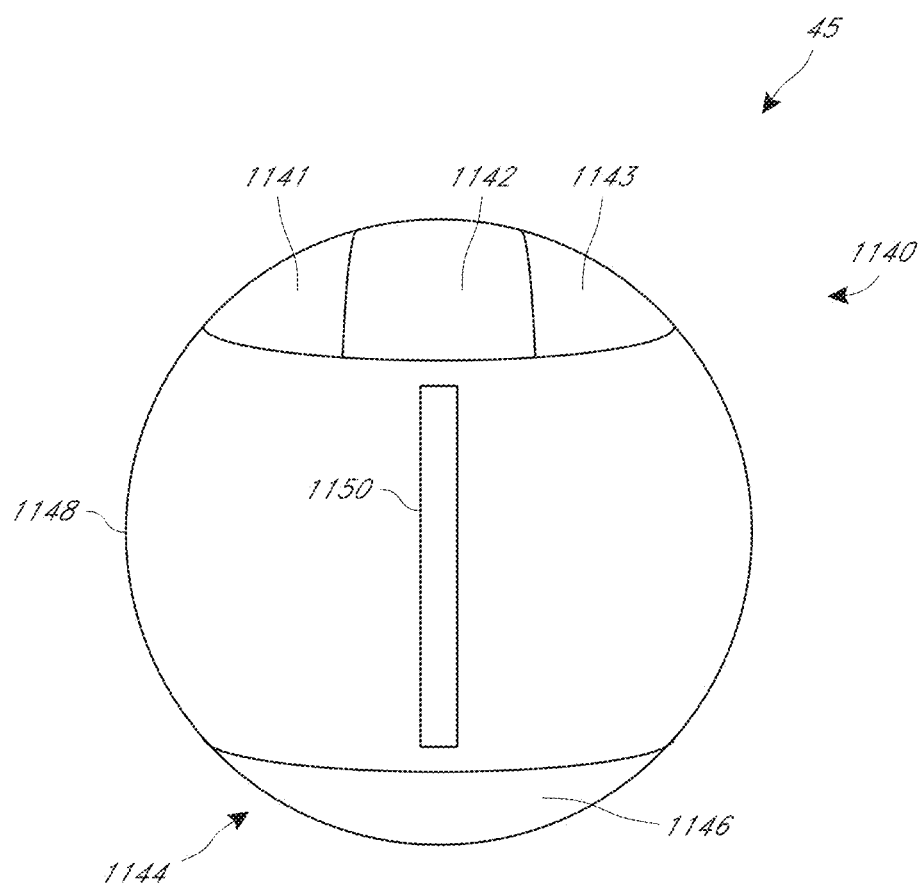
Figure 12:
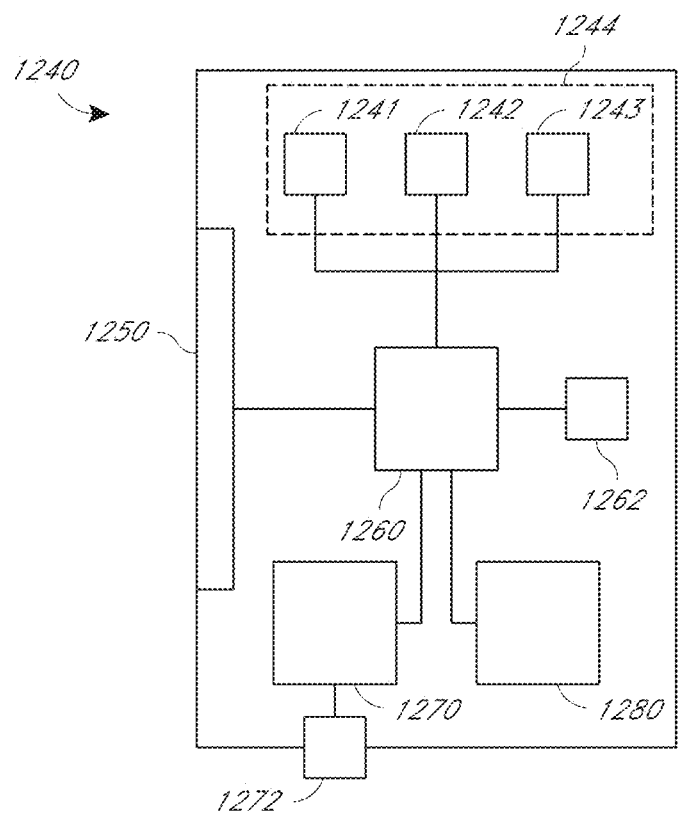
Figure 13:
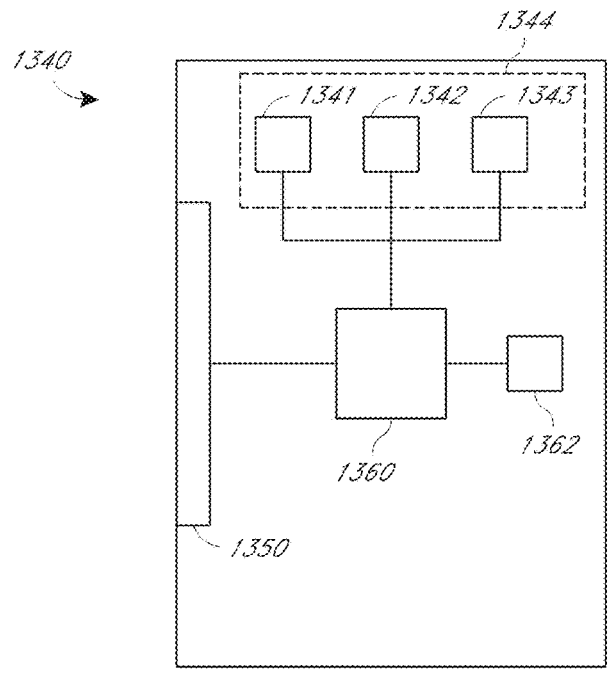
Figure 14:
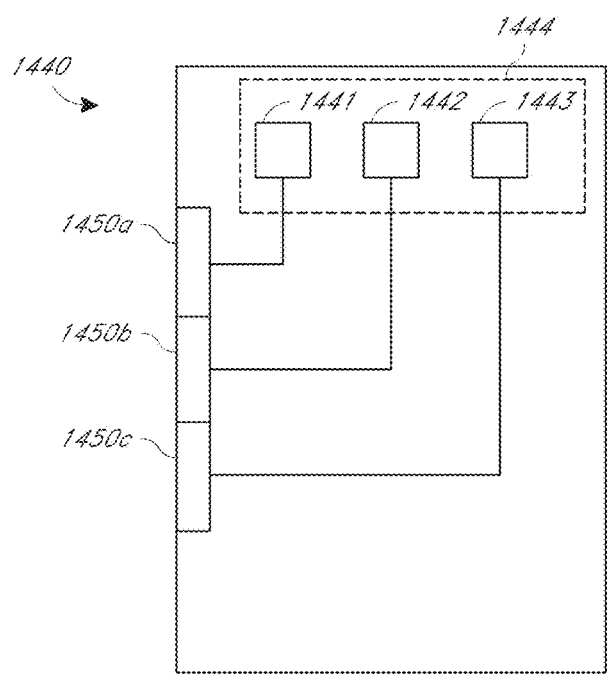

FIGS. 10A-C illustrate other examples of indicator targets for use on the vertical surface;

FIG. 11 illustrates an example of a powered indicator target;

FIG. 12 is a schematic diagram of a circuit for the powered indicator target;

FIG. 13 is a schematic diagram of another circuit for the powered indicator target;

FIG. 14 is a schematic diagram of another circuit for the powered indicator target.

Figure 15:
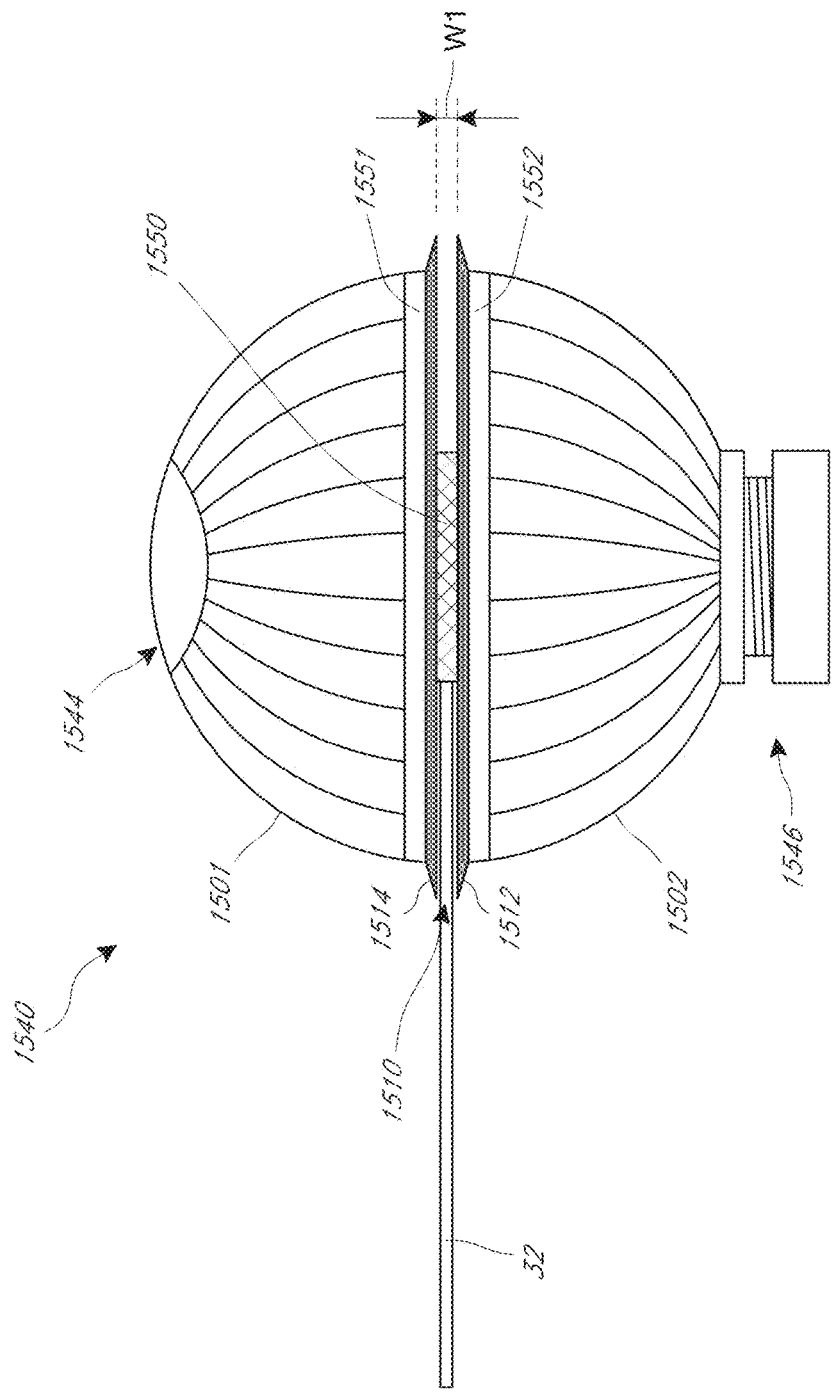

FIG. 15 illustrates another example of a powered indicator target.

Figure 16:
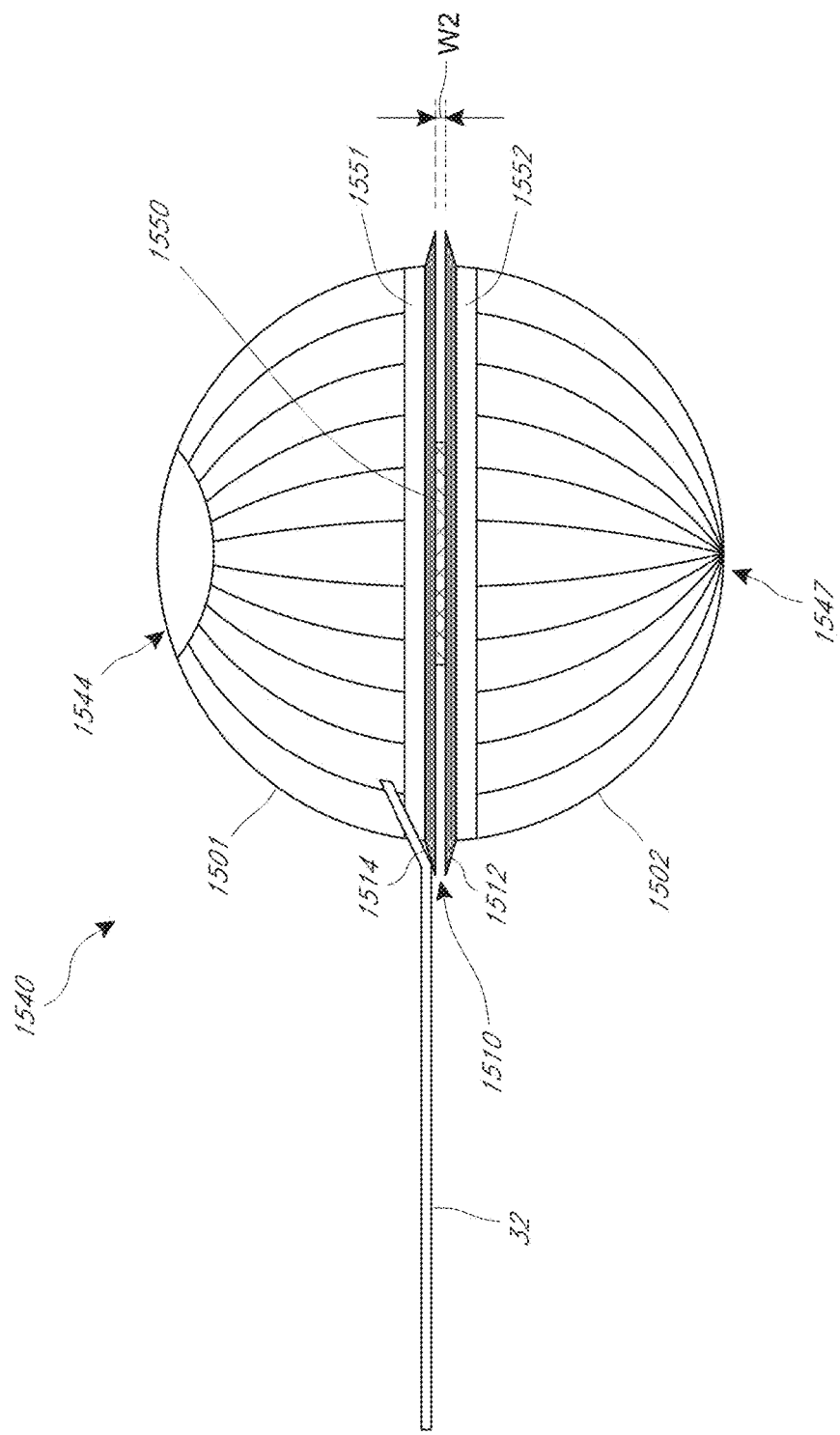

FIG. 16 illustrates the target of FIG. 15 in another configuration.

Figure 17:
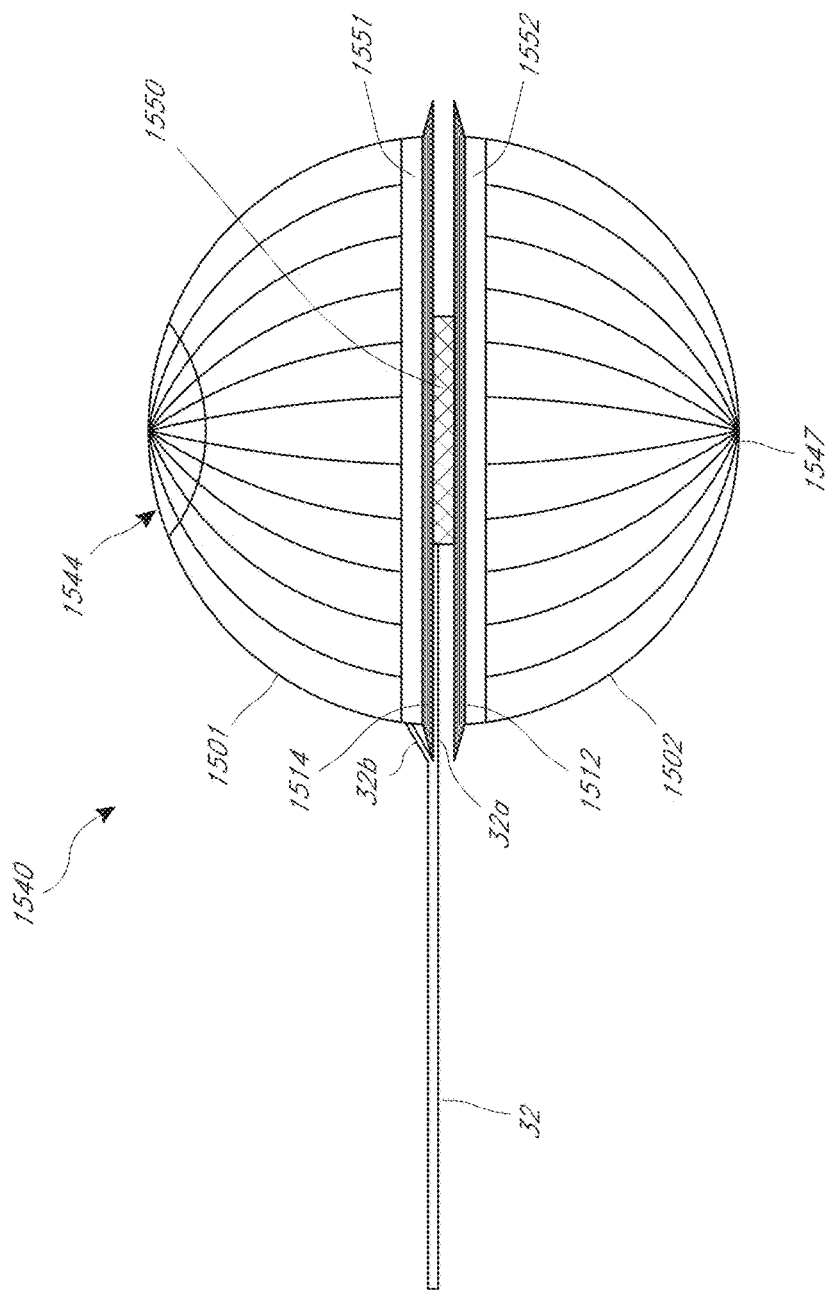

FIG. 17 illustrates a light plane striking the target of FIG. 15.

Figure 18:
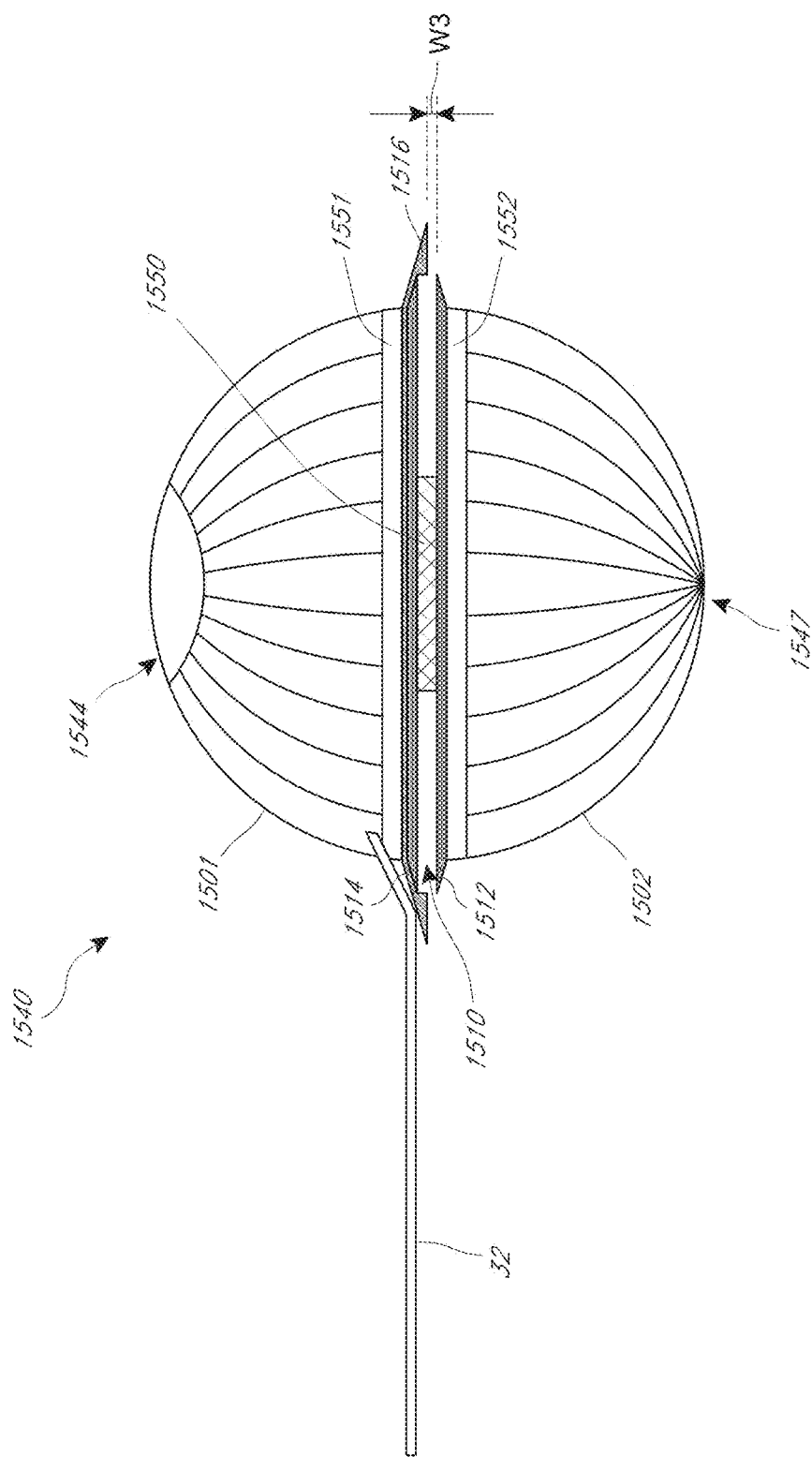

FIG. 18 illustrates the target of FIG. 15 with a spacer attachment.

Figure 19:
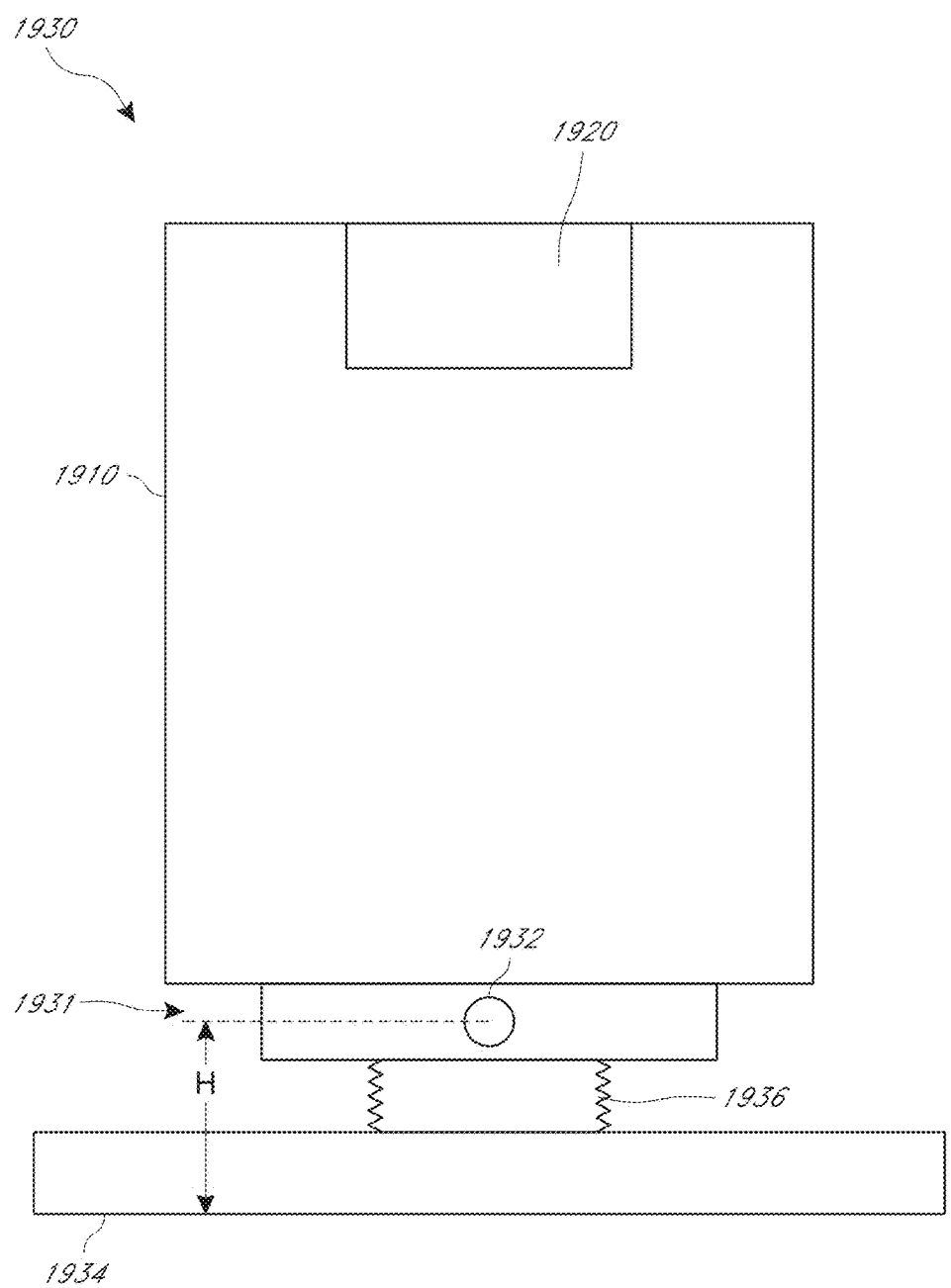

FIG. 19 is a schematic example of an adjustable floor light emitter.

Figure 20:
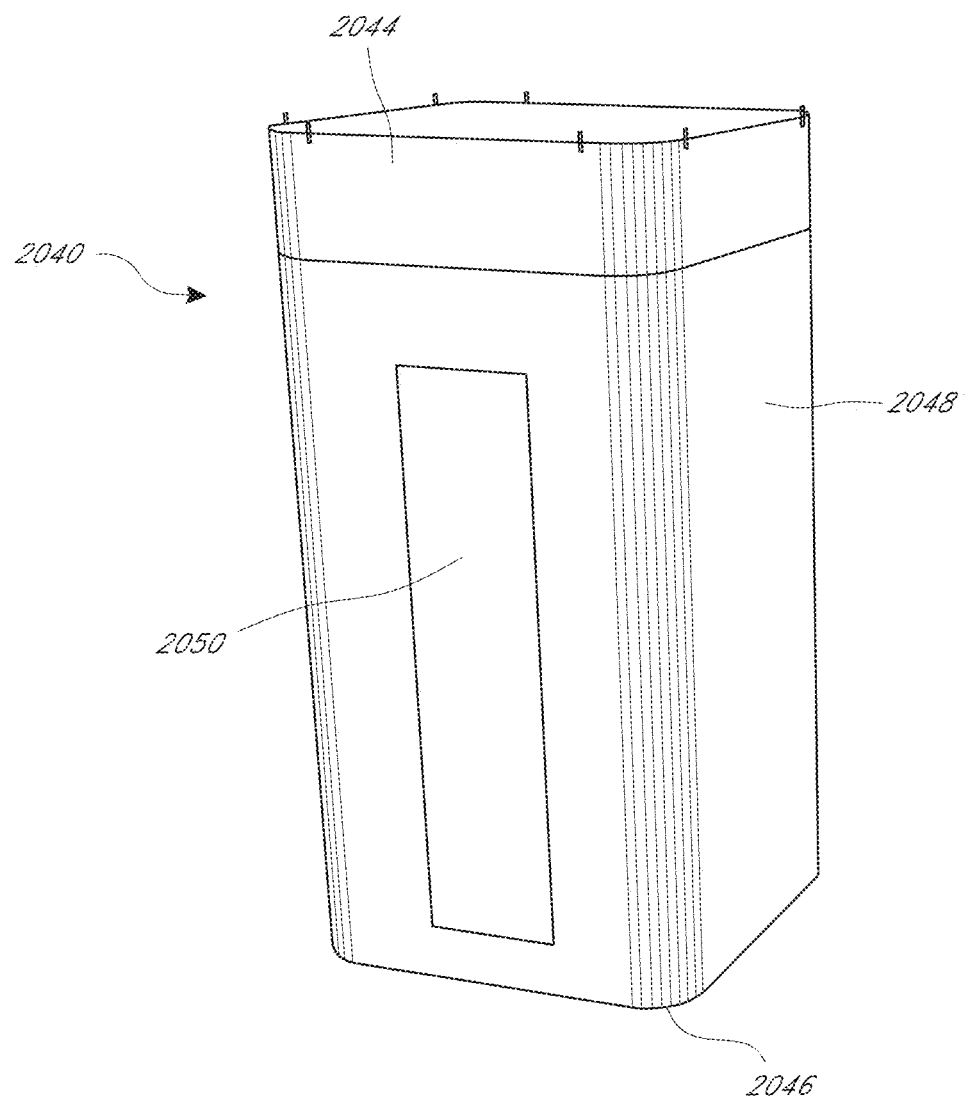

FIG. 20 illustrates another example of a powered indicator target.

DETAILED DESCRIPTION

In a stone slab installation, such as for a countertop or floor, a conventional level tool (e.g., spirit or bubble level) can be used across two different dimensions (e.g., length and width) of a support surface (in the case of flooring) and/or the slab surface itself (in the case of a countertop). The surface can accordingly be leveled by removing high areas and filling low areas and/or applying a self-leveling underlayment compound. The slab can also be leveled by insertion of shims and/or removal of areas of the support surface (e.g., cabinetry). These methods work sufficiently well for smaller and/or thicker slabs because the slabs can withstand more tension without cracking. However, a conventional level tool is insufficient to measure the surface tolerance requirements for large-format (e.g., large area) slabs and/or slabs having an intricate or complex form (e.g., an L-shaped countertop).

Another conventional level tool includes a laser projected in a plane over the surface of the slab. One or more ruler-type targets rest on the slab and are struck by the plane. By checking the point where the laser strikes each target, the topography of the slab can be measured and addressed. These target systems, however, can be labor and time intensive, especially where the surfaces are large. For example, for a large floor or countertop, many targets would need to each be individually and closely examined to ensure that the surface at that location is within the prescribed tolerance.

The leveling systems described herein have a variety of applications and are generally used to level surfaces to within a specified tolerance. The various features and advantages of the systems, apparatus, and methods of the leveling systems described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Leveling System

Figure 1:
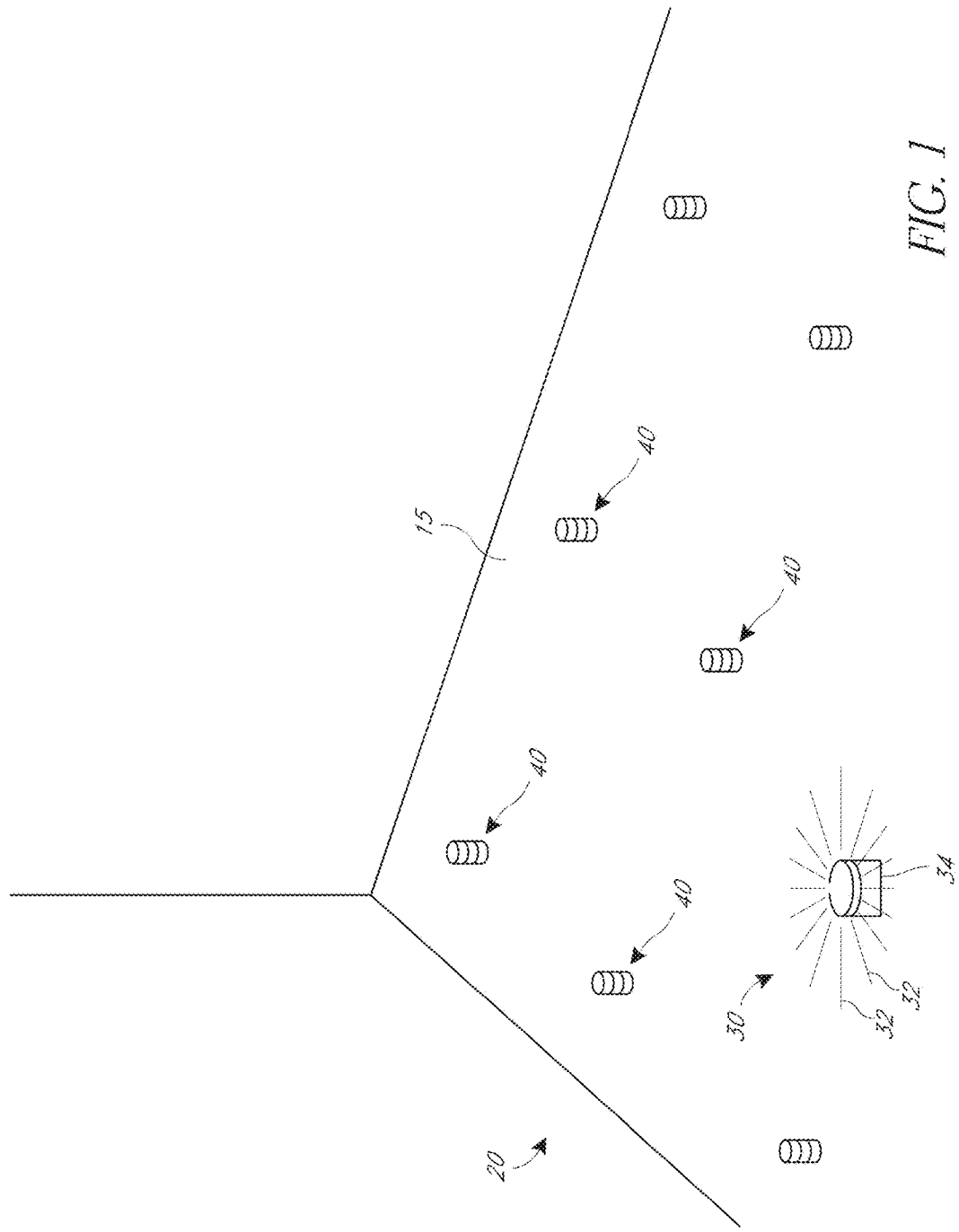
FIG. 1 illustrates an example of a leveling system in use on the surface of a floor.

FIG. 1 illustrates an example of a leveling system 20 in an exemplary operating environment. The exemplary operating environment can be a floor, such as the floor of a room or a paved outdoor area. The leveling system 20 can include a light source 30. The light source 30 can include a base 34 for resting on a surface 15. The light source 30 can emit light in a single light plane 32 over the surface 15. The light emitted can comprising a single wavelength or a band of wavelengths. The light emitted can be in the infrared, optical, ultraviolet, or other range of the electromagnetic spectrum.

The light source 30 can be a laser emitter. The laser emitter can be a line laser or a rotary plane laser. Most of the commercially available planar lasers are one of two types: line lasers or rotary lasers. Both types generally include only a single laser emitter mechanism powered by a circuit and a battery. In the line laser, the single laser emitter is directed through a series of prisms and/or mirrors that continuously project a laser plane. The line laser can generally emit laser light across 30-60 degrees, although a higher or lower range is possible. In the rotary laser, a single laser emitter is included in a rotating assembly that rotates rapidly about a central axis. The single beam emitted from the laser emitter creates an entire plane of light through the spinning motion. The plane is generally emitted in 360 degrees around the rotary level, although any subset of 360 degrees is possible by blocking portions of the plane.

The light plane 32 can be manually leveled. The light source 30 housing can include one or more surfaces or mechanism (e.g., spirit level) wherein a level tool can be used to manually level the light plane 32. In some implementations, the light source 30 and light plane 32 are purposefully not level with the ground for a given application. The light source 30 and light plane 32 can be angled with respect to the ground. The angled light plane 32 can be used to 'level' the surface to a desired tolerance relative to the angled plane.

The light source 30 can optionally include a self-leveling mechanism (not shown). The self-leveling mechanism ensures that the emitted light is parallel with the ground. Generally, self-leveling mechanisms in laser levels includes a pendulum attached to the laser emitter assembly (for either the line or rotary laser) within a body of the laser level. The laser emitter assembly can be movable about two axes with respect to the rest of the body. The pendulum swings beneath and is attached to the laser emitter assembly. The pendulum comes to rest plumb (straight up and down with respect to the ground) and the laser emitter assembly is attached perpendicularly to the pendulum. The laser emitter assembly can thereby be leveled with the ground by the force of gravity acting on the pendulum. The self-leveling mechanism can also be assisted by a dampening mechanism (e.g., magnetic) that slows and stops the swinging motion of the pendulum. Although other suitable light sources 30 are contemplated herein (e.g., LEDs), line lasers and rotary laser are commercially, available, produce a high-powered laser, and can operate in the visible range of light which can be convenient and safe for a user to operate.

The leveling system 20 can include a plurality of light indicators or targets 40. In some implementations, the leveling system includes, 1, 2, 3, 5, 10, 20 or more targets 40. The targets 40 can each be designed to be used in conjunction with the light emitter 30. As illustrated further in FIG. 4 (discussed below) the light targets 40 are used to identify areas of the surface 15 that are high, low and/or level relative to a reference plane at a distance below the emitted light 32. A user of the leveling system 20 can determine levelness of the surface 15 by placing the targets 40 at locations on the surface 15. The light emitter 30 can then direct the light plane 32 to strike each of the light targets 40. Based on the position of the light plane 32 striking each of the targets 40 and/or the response of the targets 40 to the light plane 32, the targets 40 can indicate to a user whether the corresponding area of the surface 15 is high, low or level relative to the reference plane (within a tolerance of the system 20).

Figure 2:
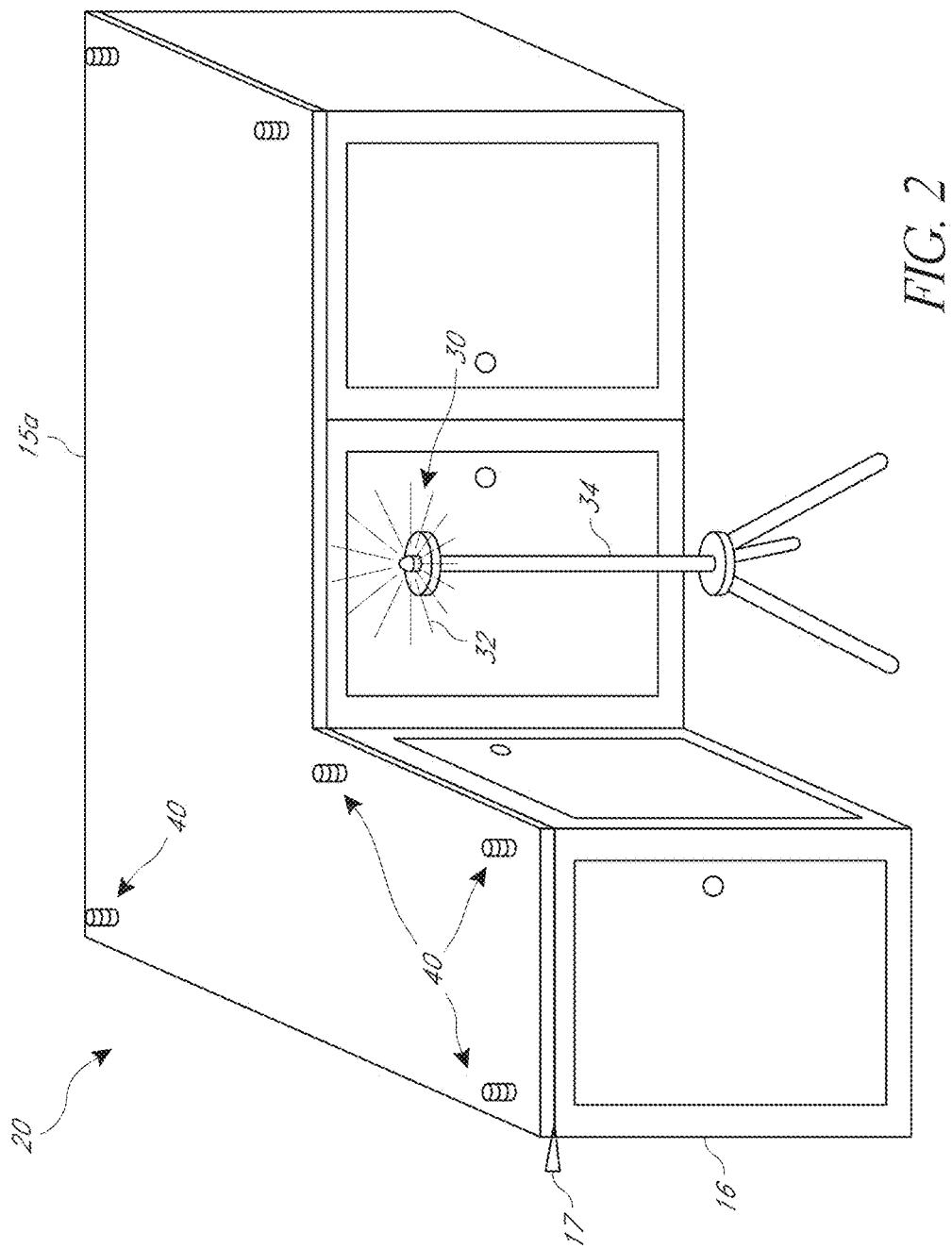
FIG. 2 illustrates the leveling system in use on the surface of a countertop.

FIG. 2 illustrates the leveling system 20 in use in another exemplary operating environment. The exemplary operating environment can be a countertop or other elevated surface 15a. While certain exemplary operating environments for the leveling system 20 are described (flooring in FIG. 1 and countertops in FIG. 2) the applications for the leveling system 20 are myriad and not limited herein.

The leveling system 20 can be used to level the elevated surface 15a. The targets 40 can be located at various locations on the surface 15a, such as at corners of the surface 15a. The light emitter 30 can be mounted on the base 34. The base 34 can be a tripod that raises the light plane 32 to a height above the surface 15a. The light plane 32 can be positioned to strike each of the targets 40. The height of the light plane 32 above the surface 15a can be less than a total height of each of the targets 40. A user can adjust areas of the surface 15a by adjusting the substrate 16 (e.g., cabinetry) and/or the interface between the top of the substrate 16 and the surface 15a. One or more shims 17 can be used to level the surface 15a to within a desired tolerance.

Figure 3:
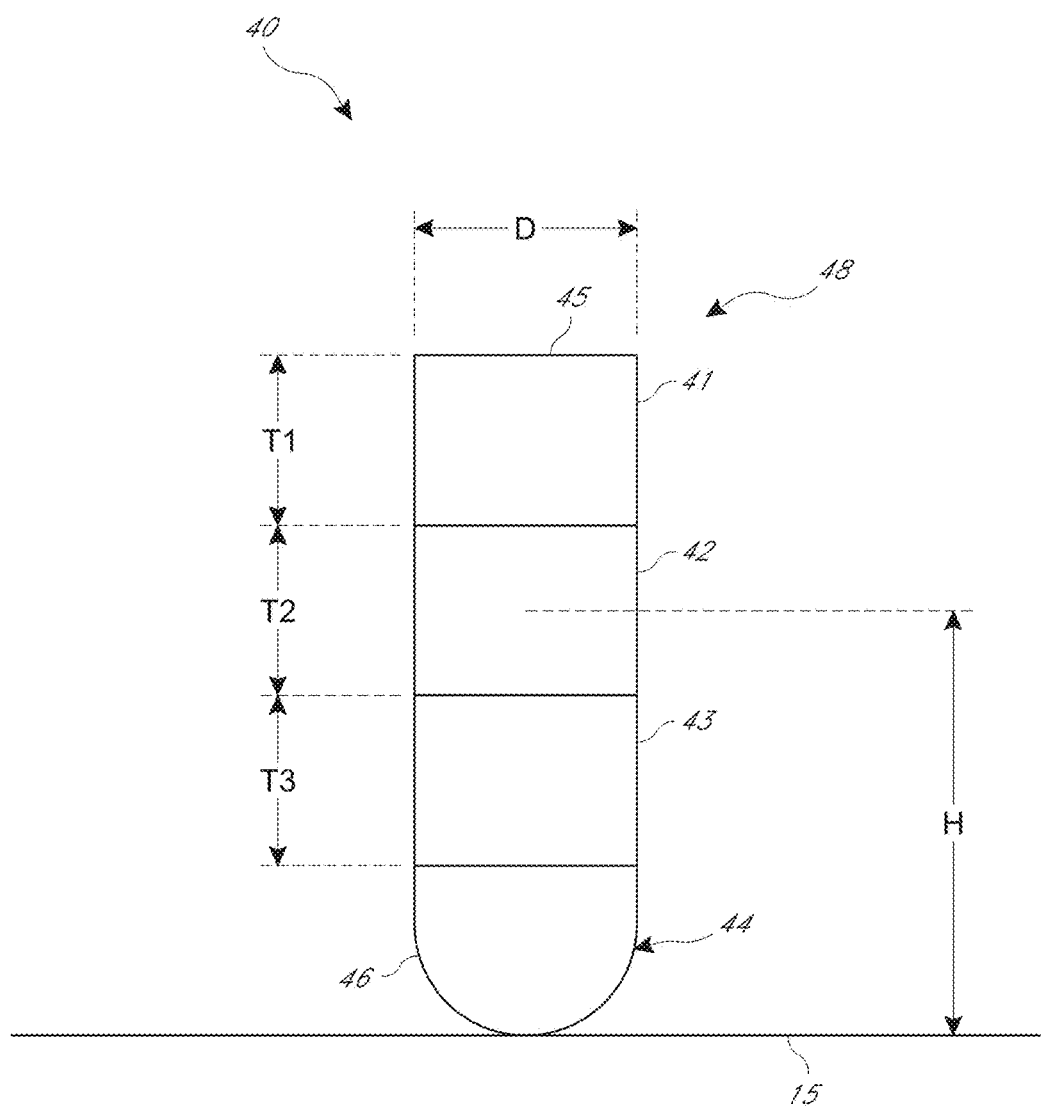
FIG. 3 illustrates an example of an indicator target of the leveling system.

FIG. 3 illustrates an example of the indicator or target 40 for use with the leveling system 20. The target 40 can include a target body 48. The target body 48 can be generally cylindrical in shape. In other implementations, the target body 48 can have spherical, prismatic, pyramidal, or other form factors. The target body can include an upper end 45 and a lower end 44. The lower end 44 can engage with the surface 15 to support the target body 48 in a generally vertical orientation with respect to the surface 15.

The lower end 44 can include a self-leveling base 46. The self-leveling base 46 can be a domed or spherically shaped lower protrusion on the target body 48. The self-leveling base can be weighted or heavy relative to the rest of the target body 48. The center of mass of the target 40 can be within the domed protrusion of the lower end 44. The self-leveling base 46 can orient the target body 48 into the generally vertical orientation. Implementations of the self-leveling base having no moving parts can be very simple and cost effective to manufacture. The self-leveling base 46 can be made out of a heavy material such as metal, sand, liquid or any other material. Other designs for self-leveling bases can also be used in conjunction with the target 40.

The target body 48 can include a first layer 41, a second layer 42 and/or a third layer 43. In some implementations, the target body 48 can include more or fewer layers. Each of the layers can be primarily made of a fluorescent material. Fluorescence occurs when a fluorescent material absorbs light from a light source. The energy from the lights source excites at least some electrons contained within the atoms of the fluorescent material into a higher energy state. These electrons then drop back down to a lower energy state where they are more stable. The energy released by dropping to a lower energy state for the electrons is emitted from the fluorescent material as a photon having a specific wavelength. The wavelength can be in the optical range of light and manifest to a user of the system 20. The fluorescent material can be an acrylic, plexiglass, other types of plastics, glass or any other fluorescent solid material.

The leveling system 20 can use fluorescence to indicate which of the fluorescent material layers 41, 42, 43 of the target body 48 is struck by the light plane 32. Each of the fluorescent material layers 41, 42, 43 can fluoresce in a color that indicates to a user, at-a-glance, where the light plane 32 is striking each of the targets 40. This information can identify high, low, and/or level spots of the surface 15.

Each of the layers 41, 42, 43 can have a thickness measured along a longitudinal (e.g., vertical) axis of the target body 48. The layers 41, 42 and 43 can be stacked on top of each other to form the target body 48. In one implementation, there are no gaps between adjacent layers. A top surface of the second layer 42 can be abutted against a lower surface of the first layer 41. A bottom surface of the second layer 42 can be abutted against a top surface of the third layer 43.

The first layer 41 can have a thickness T1. The second layer 42 can have a thickness T2. The third layer 43 can have a thickness T3. The thicknesses T1, T2, and T3 can be the same or different. The thickness T2 can be based on the desired substrate variation (tolerance) for levelness measured by the system 20. In certain nonlimiting examples, the tolerance can be 1/32 of an inch (0.794 mm), 1/16 of an inch (1.59 mm), or 1/8 inch (3.18 mm). To ensure that the surface 15 is within tolerance of the level plane the second layer 42 can have the thickness T2 equivalent to the tolerance. The thicknesses can be measured in a vertical direction, along an axis of the target body 48 and/or perpendicular to the light plane 32.

Tolerances for surface levelness are also commonly expressed in terms of height per length. For example, ANSI A108.02 standards dictate that large format tiles allow a maximum substrate variation of no more than 1/8 inches (3.18 mm) in 10 feet (3.05 m) and no more than 1/16 inches (1.59 mm) in 36 inches (91.440 cm). Manufacturers may have even more stringent recommendations for substrate variation tolerances. The leveling system 20 can verify compliance with height per length tolerances by using two targets 40 spaced apart at the indicated length. The two targets can also have second layers 42 with the thickness T2 equal to the indicated height. For example, the ANSI A108.02 can be verified by one set of targets having T2 equal to 1/8 inches (3.18 mm) that are set apart 10 feet (3.048 m). A second set of targets 40 having T2 equal to 1/16 inches (1.59 mm) can be set apart 36 inches (91.440 cm). The light plane 32 must strike both second layers to demonstrate compliance with the height per length tolerances.

In certain nonlimiting examples, T1, T2, and/or T3 can be approximately equal to 1/128 inches (0.198 mm), 1/64 inches (0.397 mm), 1/32 inches (0.794 mm), 1/16 inches (1.59 mm), 1/8 inches (3.18 mm), 1/4 inches (6.35 mm), 1/2 inches (1.270 cm) or less or greater thicknesses. Optionally the first surface and/or the third surface 41, 43 can have thicknesses T1 and T3 greater than, less than or equal to the thickness T2. In certain nonlimiting examples, T1 and/or T3 can be related to T2 by a factor of 0.5, 1, 1.5, 2, 3, 5, 10, 20, 50, 100, or any other factor.

The second layer 42 can be centered at a height H above the lower portion 44. Height can be approximately equivalent to a height of the light plane 32 over the surface 15. height H positions the target body 48 in a position where the target body 48 is struck by the plane 32 at the second layer for level areas of the surface 15. The target body 48 can have a diameter D.

The target 40 can include an integrated ruler, such as on the target body 48. The ruler can be centered at 0 at a center of the second layer 42. The ruler 49 can assist a user to analyze the levelness of the surface 15 and execute remedial procedures to modify the surface 15.

The target body 48 of the target 40 can also include other portions or layers that are opaque, reflective, and/or transparent. In some implementations, the target body 48 includes only two fluorescent layers or only one fluorescent layer. For a target 40 with one layer (e.g., layer 42), a user can assess levelness of the surface 15 using the system 20 by ensuring that all of the targets are fluorescing. In another implementations, all or several layers of the target body 38 are all fluorescent with the central layer (at layer 42) being opaque, reflective and/or translucent. In such systems, a user can easily assess levelness using the system by ensuring that none of the targets are fluorescing.

Figure 4:
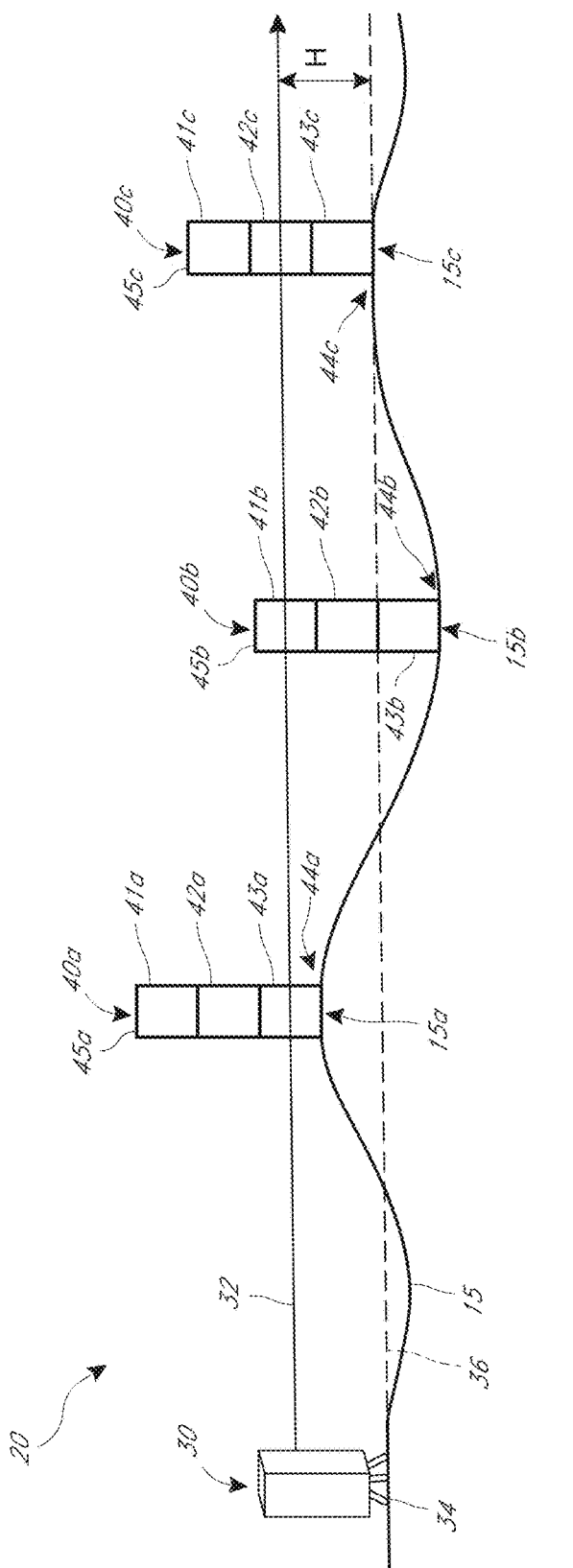
FIG. 4 illustrates the leveling system with a plurality of indicator targets in use on a surface.

FIG. 4 illustrates the leveling system 20 in use to level the surface 15. The leveling system 20 is deployed on the surface 15. The surface 15 is representative of any surface to be measured using the leveling system 20. The light emitter 30 can include the base 34. The base 34 can rest on the surface 15. The light emitter 30 emits the light plane 32. The light plane 32 can be located at the height H above a reference plane 36. The reference plane 36 can be the desired level for the surface 15. The light plane 32 and the reference plane 36 can be parallel and separated by the height H.

Targets 40a, 40b and 40c can be located at various locations on the surface 15. Targets 40a, 40b, and 40c are implementations of target 40, the targets and components thereof being further designated by the addition of a letter a, b, or c. The light plane 32 can strike each of the targets 40a, 40b and 40c. The target 40a can include a first or upper layer 41a, a second or middle layer 42a and/or a third or lower layer 43a. The target 40b can include a first or upper layer 41b, a second or middle layer 42b and/or a third or lower layer 43*b*. The target 40*c* can include a first or upper layer 41*c*, a second or middle layer 42*c* and/or a third or lower layer 43*c*.

For the purposes of illustration, target 40*a* is placed at a high area 15*a*, the target 40*b* is placed at a low area 15*b*, and the target 40*c* is at a level area 15*c* with respect to the reference plane 36. In the high area 15*a*, the light plane 32 can strike the target 40*a* below the second layer 42*a*. The light plane 32 can strike the third layer 43*a*. The light striking the third layer 43*a* can cause the fluorescent material thereof to fluoresce in a first color. The first color can indicate to a user of the system 20 that the area 15*a* is above the reference plane 36.

In the low area 15*b*, the light plane 32 can strike the target 40*b* above the second layer 42*b*. The light plane 32 can strike the first layer 41*b*. The light striking the first layer 41*b* can cause the fluorescent material thereof to fluoresce in a second color. The second color can indicate to a user of the system 20 that the low area 15*b* is below the reference plane 36.

In the level area 15*c*, the light plane 32 can strike the target 40*c* at the second layer 42*c*. The light striking the second layer 42*c* can cause the fluorescent material thereof to fluoresce in a third color. The third color can indicate to a user of the system 20 that the level area 15*b* is level with the reference plane 36. The center of the second layer 42*c* can be at the height H above the reference plane 36.

The first, second, and third colors can be different. For example, the first and second colors can each be red and the third color can be green. Alternately the first color can be red, the second color can be yellow and the third color can be green. Other colors and combinations of colors can be used. The colors can intuitively and at-a-glance indicate to a user the levelness of the surface 15.

Figure 5:
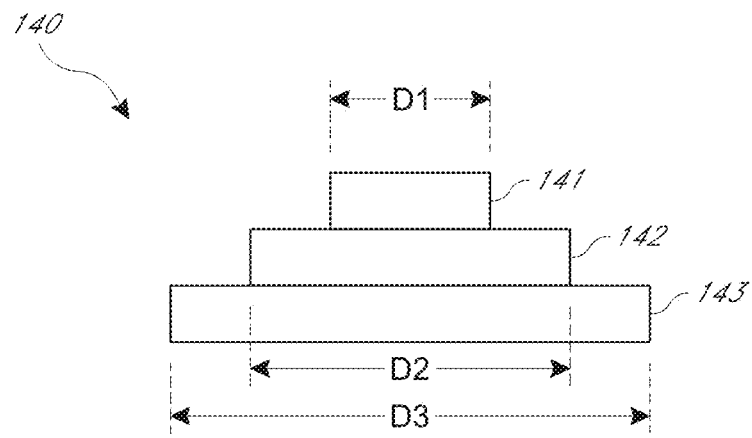
FIG. 5 illustrates another example of an indicator target.

FIG. 5 shows another example of a target 140 having components similar to the target 40 and numbered accordingly in the 100 series. The cross-sectional shape of each of these layers can be any two-dimensional shape. The cross-sectional shape can be circular, square, rectangular, elliptical, polygonal or any other shape. The target 140 can include a first layer 141 having a diameter D1. The target 140 can include a second layer 142 having a diameter D2. The target 140 can have a third layer 143 having a diameter D3. D3 can be bigger than D2. D2 can be bigger than D1.

The side profile of the target 140 (as shown in FIG. 5) can be generally tier-shaped. This allows a user looking down at the surface 15 to easily see each of the layers 141, 142, 143, and possible fluorescence thereof from light plane 32, from an upper perspective view (e.g., standing). The target 140 can be used in conjunction with a self-leveling base and/or base that can adjust the height of the target.

Figure 6:
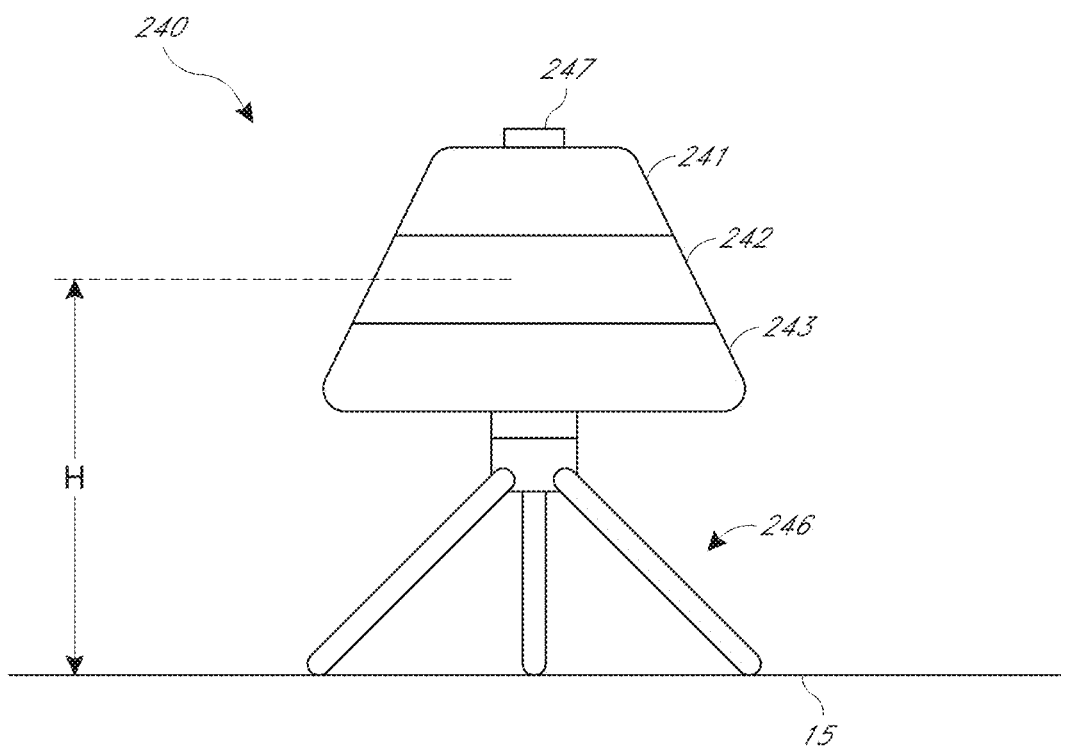
FIG. 6 illustrates another example of an indicator target.

FIG. 6 shows another example of a target 240 having components similar to the target 40 and numbered accordingly in the 200 series. The target 240 can have a target body 248 having a first layer 241, a second layer 242 and a third layer 243. The target body 248 can include a base 246. The base 246 can be self-leveling or form a stand (e.g., tripod). The base 246 can have an adjustable height. The base 246 can be adjusted to center or otherwise align the light plane 32 with the second layer 242. The height adjustment of the base 246 can include turning of one or more threaded features, adjustment of legs of a tripod, the addition or reduction of spacers, and/or other height adjustment mechanisms.

The target 240 (e.g., base 246) can include a post 247. The layers 241, 242 and/or 243 can each include a central aperture. The layers 241, 242 and/or 243 can be assembled on the post 247 in a stacked configuration. The layers 241, 242 and/or 243 can be movable on the post 247 to adjust the heights thereof above the surface 15. The layers 241, 242 and/or 243 can be movable on the post 247 so second layer 242 is at the height H. Accordingly, the heights of one or more of the layers 240 of the target 240 can be adjustable. The post 247 and the base 246 can be used together or separately.

Similar to the target 140, the target body 248 can have a tiered or pyramidal structure that enhances a user's view of the layers of the target body from a top perspective view. The layers can be adhered, pressed, formed, or otherwise assembled together into the target body 248. The target 240 can be used in conjunction with a self-leveling base and/or base that can adjust the height of the target.

Figure 7:
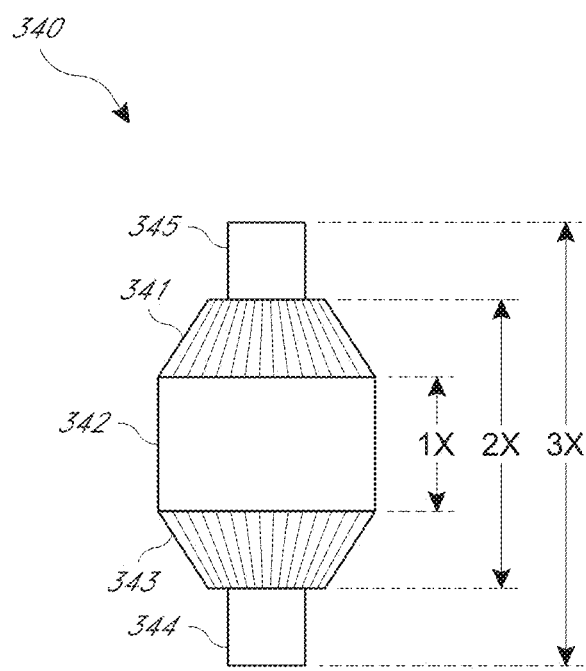
FIG. 7 illustrates another example of an indicator target.

FIG. 7 shows another example of a target 340 having components similar to the target 40 and numbered accordingly in the 300 series. The target 340 has at least five layers of fluorescent material 341, 342, 343, 344, 345. The outer layers 344, 345 can have the same color fluorescent material. The next inner layers 341, 343 can have the same color fluorescent material. The outer layers 344, 345 can have the same thickness (e.g., height). The inner layers 341, 343 can have the same thicknesses (e.g., height). The inner layers 341, 343 can together have a total thickness (or height) equivalent to the thickness (e.g., height) of the center layer 342, thereby representing an additional interval (2X) outside of the desired tolerance. The outer layers 344, 345 can together have a total thickness (e.g. height) equivalent to the thickness (e.g., height) of the center layer 342, thereby representing two additional intervals (3X) outside of the desired tolerance. In other implementations, the outer layers 344, 345 can have a thickness (e.g., height) of more than the thickness (e.g., height) of the center layer 342, representing a broader range of high and low areas of the surface 15. The target 340 can be used in conjunction with a self-leveling base and/or base that can adjust the height of the target.

Figure 8A:
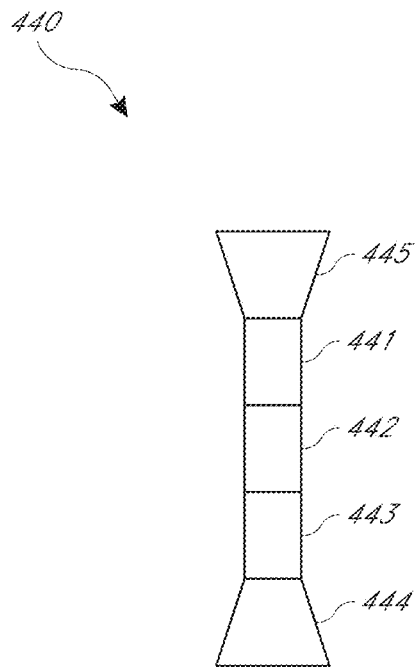
FIG. 8A illustrates another example of an indicator target.

FIG. 8A shows another example of a target 440 having components similar to the target 40 and numbered accordingly in the 400 series. The target 440 can have five layers and can include a first layer 441, a second layer 442, and third layer 443. The fourth and/or fifth layers 444, 445 can be cone-shaped or otherwise flared to increase visibility of the fluorescent effect to a user. The target 440 can be used in conjunction with a self-leveling base and/or base that can adjust the height of the target.

Figure 8B:
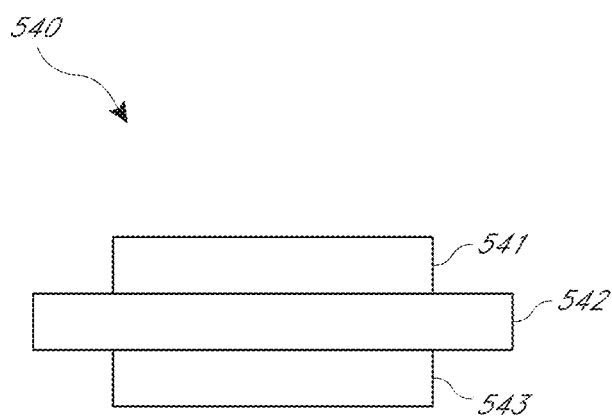
FIG. 8B illustrates another example of an indicator target.

FIG. 8B shows another example of a target 540 having components similar to the target 40 and numbered accordingly in the 500 series. The target 540 can include a first layer 541 and a second layer 542 and a third layer 543. The first layer 541 can have a first diameter D1. The second layer 542 can have a second diameter D2 that is larger than the first diameter D1. The third layer 543 can have a third diameter D3 that is less than or greater than the second diameter D2 and/or the first diameter D1. The layers 541, 542, and/or 543 can have any cross-sectional shape. The target 540 can be used in conjunction with a self-leveling base and/or base that can adjust the height of the target.

Outer edges of the layers of the target 540 (or any of the layers of targets described herein) can be scored, clouded or otherwise textured to reflect the light of the light plane 32. This reflection can increase visibility the struck layers. The scoring, clouding or texturing can be incidental to cutting of the layers and/or assembling of the layers together.

Figure 9:
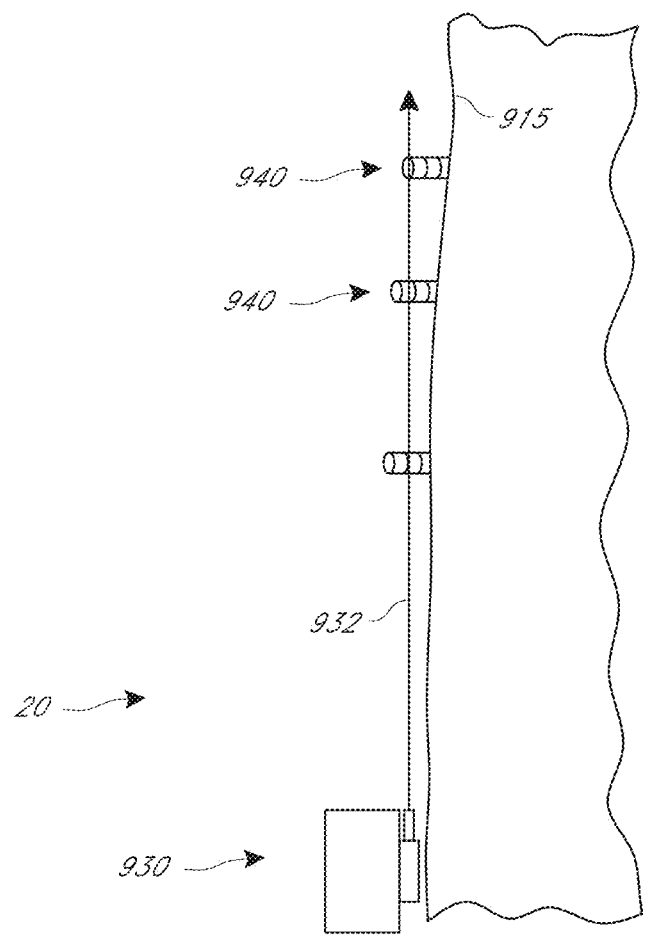
FIG. 9 illustrates an example of another leveling system in use on a vertical surface.

FIG. 9 shows another usage environment for a system 920 having components similar to the system 20 and numbered accordingly in the 900 series. The system 920 can be used to check plumb of a wall or other generally vertical surface 915. The system 920 can include a light emitter 930 that emits a vertical light plane 932. A base 934 of the light source 930 can support the light source to emit the plane 932 vertically.

A plurality of mountable targets 940 can be mounted (e.g., fixed or removable attached) at various points along the surface 915 for measuring plumbness thereof. Targets 940 can have structures similar to any of the targets (e.g., targets 40) described previously, with the addition of a mountable base portion.

FIGS. 10A-C show examples of targets 940a-c having components similar to target 40 and numbered accordingly in the 900 series with the addition of a letter a, b, or c. The targets 940a-c can include mountable base portions 946a-c and target bodies 948a-c. The mountable base portions 946a-c can be screwed, snapped, press-fit, adhered, or otherwise removably coupled with the respective target bodies 948a-c. The target bodies 948a-c can extend outwardly and approximately perpendicularly from the vertical surface 915. The mountable base portion 946a can be a suction cup. The suction cup is configured to attach with a wall, window, glass or any kind of smooth structure. The mountable base portion 946b can be a tack or nail. The tack or nail base can be used in drywall, wood and any other soft, compressible of resilient material of the surface 915. The mountable portion 946c can be a magnet. Magnet can be useful for attaching the target 940c with steel studs, nails, or other ferrous materials in vertical surface 915.

Powered Indicator Targets

FIG. 11 illustrates an example of another type of target for use with the leveling system 20, a powered indicator target 1140. The previously described targets comprise one or more layers of fluorescent material (e.g., 40, 140, 240, 340, 440, 540, 940) that fluoresce in response to the light plane 32 to indicate levelness. The target 1140 can include indicator lights 1144 powered by a battery, or other power source, and electronically controlled to respond to the light plane 32 to indicate levelness.

The target 1140 can include a target body 1148. The target body 1148 can be generally spherical. In other implementations, the target body 1148 can be generally cylindrical, prismatic, or any suitable shape. A top or upper surface 1145 of the target body 1148 can include the indicator lights 1144. A bottom surface of the target body 1148 for resting on the surface 15 can include a self-leveling base 1146. The self-leveling base 1146 can be curved, domed and/or weighted to keep the target body 1148 generally upright and vertical relative to the surface 15. The target body 1148 can be generally curved to form the domed portion thereof. Optionally, the target body 1148 can include a manual (e.g., spirit or bubble) level to check levelness thereof.

The target 1140 can include one or more shims or spacers (not shown) on which the target 1140 can be set between the surface 15 and the bottom surface of the target body 1148. The shims or spacers can provide a clean, smooth surface on which the self-leveling base can orient the target body 1148 to be generally vertical. The light source 30 and/or light plane 32 can be adjusted to take into account the presence of the shims or spacers.

The target 1140 can include a light receiver 1150. A light receiver (also known as a photoelectric device or photo detector) is a sensor that converts light energy into an electrical signal. Various types of light receivers are available commercially and include, but are not limited to: photoelectric effect sensors, photo conductor sensors, and PN junction devices. Certain types of light receivers (e.g., photoelectric effect sensors) can detect only certain types of light (e.g., infrared, optical, ultraviolet) or are tuned to detect only certain frequencies or amplitudes of light, while other sensors can detect spectral light bands more broadly.

The light receiver 1150 can include a single sensor or multiple sensors. The light receiver 1150 can be oriented in a generally vertical manner on the target body 1148. The self-leveling base 1146 can orient the light receiver 1150 to be generally vertical during use. The light receiver 1150 can detect the relative location (e.g., elevation) the light plane 32 strikes the target body 1148.

The indicator lights 1144 can comprise one or more LEDs, light bulbs, or other light-emitting devices. The indicator lights 1144 can include a first light 1141, a second light 1142 and/or a third light 1143. The indicator lights 1144 can be color-coded to indicate to a user the levelness of the surface 15 in response to the light plane 32. The light receiver 1150 can be electronically coupled with each of the indicator lights 1144.

In use, the light plane 32 can be set up with the light emitter 30. One or a plurality of targets 1140 can be set on the surface 15 and the light plane 32 can strike the light receiver 1150 of each. Depending on the location the light plane 32 strikes each light receiver 1150, the appropriate indicator light 1144 can be illuminated. The illuminated, color-coded indicator light 1144 can indicate to a user the levelness of the surface 15 relative to the reference plane 36.

The first light 1141 (when illuminated) can indicate a low area of the surface 15. The second light 1142 can indicate a level area of the surface 15. The third light 1143 can indicate a high area of the surface 15. Optionally, the indicator lights 1144 can include only one or two lights. With one light, the illuminated light can indicate a level area of the surface 15 and the unilluminated light can indicate a non-level area of the surface 15, or vice versa. With two lights, one light can indicate a level area and the other light can indicate a non-level area, or vice versa. The two lights can also be color-coded.

FIG. 12 illustrates a schematic electrical circuit 1240 of the target 1140. The circuit 1240 can be contained in the target body 1148. The circuit 1240 can include a light receiver 1250, a controller 1260, indicator lights 1244, and a battery 1270. The light receiver 1250 can generate a signal when struck by the light plane 32 that indicates the position of the light plane 32 relative to the light receiver 1250/target body 1148. The light receiver 1250 can have two, three or more sensors spaced vertically together.

The signal from the light receiver 1250 can be received by the controller 1260. The controller 1260 can execute instructions stored on a computer readable medium 1262 based on the signal from the light receiver 1250. The instructions executed by the controller can generate a signal to deliver power to one of the indicator lights 1244. The indicator lights 1244 can include the lights 1241, 1242 and 1243. The indicator lights 1244 can be powered by the battery 1270. The indicator light 1244 that is powered can be based on the location at which the light plane 32 strikes the light receiver 1250. The indicator light that is illuminated by the power from the battery 1270 can indicate to a user whether the location on the surface 15 at which the target 1140 is placed is high, low, or level relative to the reference plane 36.

The circuit 1240 can optionally include a speaker 1280. The speaker 1280 can emit one or more sounds to indicate to a user the levelness of the surface 15. Similar to the indicator lights 1244, the speaker can emit a sound that is audible to a user that indicates were the light receiver 1250 is struck by light plane 32. A first sound can correspond to a high surface area. A second sound can correspond to a low surface area. A third sound can correspond to a level surface area. In certain implementations, the speaker 1280 can emit a single sound that corresponds with the surface 15 being level. In certain implementations, the speaker 1280 can emit a single sound that corresponds with the surface 15 being nonlevel (high or low).

The circuit 1240 can include a charging port 1272. The charging port 1272 can be electrically coupled with the battery 1270 to provide a charge thereto. The battery 1270 can be charged from an external power source connected with the charge port 1272. The charge port 1272 can be a wired or wireless charging port. As a wireless charging port, the charge port 1272 can transmit energy through induction from a corresponding wireless charger.

In certain implementations, the target 1140 (and any other powered or unpowered targets described herein; 40, 140, 240, 1140, etc.) can be included in a kit. The kit can include a container for containing a plurality of targets and a light source (e.g., light source 30). The container can include a lid for enclosing the container and receptacles therein for storing the targets and/or light source. The receptacles can be padded and/or contoured for storing and preventing shock damage to the targets and light source. One or more of the receptacles can include a charging port to interface with the charge port 1272. The charging port can be a wireless charger. The targets can be automatically charged by being placed within the receptacles. The container can include a battery pack and/or connection with an external power source (e.g. wall outlet) to provide power to the charging ports.

FIG. 13 illustrates a schematic electrical circuit 1340 of the target 1140. The circuit 1340 can include a light receiver 1350, a controller 1360, and indicator lights 1344. The light receiver 1350 can be configured to generate a signal when struck by the light plane 32 that indicates the position of the light plane 32 relative to the light receiver 1350.

The signal can be received by the controller 1360. The controller 1360 can execute instructions stored on a computer readable medium 1362 based on the signal from the light receiver 1350. The instructions executed by the controller can generate a signal to deliver power to one of the indicator lights 1344. The indicator lights 1344 can include the lights 1341, 1342 and 1343. The indicator light 1344 that is powered can be based on the location at which the light plane 32 strikes the light receiver 1350. The indicator light 1344 can indicate to a user whether the location on the surface 15 at which the target 1140 is places is high, low, or level relative to the reference plane 36.

The circuit 1340 does not include a battery. Instead, the light receiver 1350, controller 1360, and indicator light 1344 are powered by the light received from the light plane 32. The light receiver 1350 (e.g., photoelectric effect sensor) be tuned to the frequency of the light in the light plane 32 for higher-efficiency energy conversion. Given the power requirements for a small LED, higher frequency light (e.g., line laser) can be used in the light source 30. Optionally, the circuit 1340 includes another light receiver dedicated to powering the circuit 1340. The other light receiver can be a photovoltaic cell. Optionally, the circuit 1340 can include a photovoltaic charging cell and a battery electrically coupled therewith.

FIG. 14 illustrates a schematic electrical circuit 1440 of the target 1140. The circuit 1440 includes a light receiver 1450 and light indicators 1444. The indicator lights 1444 can include any or all of lights 1441, 1442 and 1443. The light receiver 1450 can include any or all of an upper receiver 1450*a*, a level receiver 1450*b* and a lower receiver 1450*c*. The upper receiver 1450*a* can be coupled with a light 1441. The level receiver 1440*b* can be coupled with a light 1442. The lower receiver 1450*c* can be coupled with a light 1443. Optionally, the receivers can each be directly coupled via a wire with a corresponding light.

In circuit 1440, the receivers 1450*a*, 1450*b* and 1450*c* can be tuned to the frequency and/or amplitude of the light in the plane 32. The light received at the light receiver 1450 can provide power to the light indicators 1444. As noted above, given the power requirements, the light source 30 can be a laser emitter. An advantage of the circuit 1444 is that no battery is required to power the target 1140. In another implementation, the circuit 1440 includes a battery and/or another light receiver dedicated to powering the circuit 1440. Each of the light receivers 1450*a-c* and/or lights 1441-1443 can be coupled with a booster circuit to boost power to the light when the light receiver is struck by the light plane 32.

FIGS. 15-18 illustrate a powered target 1540. The target 1540 can include an upper portion 1501 and a lower portion 1502. The upper and lower portions 1501, 1502 can be generally hemi-spherically shaped, although this is not required. The upper and lower portions 1501, 1502 can be separated by a gap 1510. The gap can have a width W1. The gap can extend around a circumference of the target 1540 or a portion thereof. The gap 1510 can be an equator of a sphere shape formed generally by the upper and lower portions 1501, 1502. The upper and lower portions 1501, 1502 can be adjustable relative to each other to widen and narrow the gap 1510. In one implementation, the gap 1510 can be adjustable between approximately 0 inches or $\frac{1}{128}$ inches (0.198 mm) and ½ inches (1.270 cm) or more, although these ranges are exemplary only.

The upper and lower portions 1501, 1502 can be coupled together via a threaded engagement (not shown) wherein rotation of the upper portion 1501 relative to the lower portion 1502 in a clockwise or counterclockwise directions can widen or narrow the gap 1510. The target 1540 can include a sensor (e.g., Hall effect, inductive, capacitive, photoelectric, or ultrasonic) that can measure the width W1 of the gap 1510. The sensor can generate a signal to a controller (e.g., controller 1260) and the controller can generate a display signal to display the gap width W1 through a user interface 1544 (e.g. LCD screen). The target 1540 can include a lock that prevents rotation of the upper and lower portions 1501, 1502 relative to each other to prevent changes to the gap 1510 once set to the width W1 by a user. The width W1 of the gap 1510 can correspond to the desired tolerance for leveling the surface 15. The user interface 1544 can include one or more indicator lights, like the indicator lights 1144, to indicate where the light plane 32 strikes on the target 1540, as described in relation to the target 1140 and circuits 1240-1440 above.

The target 1540 can include a light receiver 1550 within the gap 1510. The light receiver 1550 can be similar to the light receivers 1150, 1250, 1350, 1450 described above. The light receiver 1550 can detect the light plane 32 (e.g. through measurement of a voltage or other parameter induced in the light receiver 1550 by light plane 32). The upper portion 1501 can include a light receiver 1551. The light receiver 1551 can be similar to the light receiver 1550 and detect the light plane 32. The lower portion 1502 can include a light receiver 1552. The light receiver 1552 can be similar to the light receiver 1550 and detect the light plane 32. The upper and/or lower sensors 1551, 1552 and/or the light receiver 1550 can be used to detect the location at which the light plane 32 strikes the target 1540.

The target 1540 can include an upper reflective member 1514 and/or a lower reflective member 1512. The reflective members 1512, 1514 can be located on upper and lower edges of the gap 1510. The reflective members 1512, 1540 can include an outer circumferential edge or point and/or have an outwardly tapered cross-sectional shape, as shown in FIG. 15. The reflective members 1512, 1514 can be formed of a reflective material (e.g. metallic, plastic, or other material or coated material) to primarily reflect the light plane 32. The upper light receiver 1551 can be adjacent to the upper reflective member 1514. The lower light receiver 1552 can be adjacent to the lower reflective member 1512. One of the upper and lower receivers 1551, 1552 can detect the light plane 32 when deflected by the corresponding one of the reflective members 1512, 1514. In certain implementations, the target 1540 does not include either the reflective members 1512, 1514 and the upper and lower sensors 1551, 1552 can be disposed adjacent to the gap 1510.

The target 1540 can include a height-adjustable base 1546. Optionally the adjustable base 1546 can be self leveling. The adjustable base 1546 can support the target 1540 above the surface 15. The adjustable base 1546 can be adjusted to raise and lower a height of the target 1540 above the surface (e.g. to align the gap 1510 with the light plane 32). In one implementation, the adjustable base 1546 includes a threaded adjustment mechanism wherein rotation of an upper portion of the adjustable base 1546 relative to the lower portion of the adjustable base 1546 in a clockwise or counterclockwise direction can correspondingly raise or lower the target 1540. The adjustable base 1546 can adjust the height of the light receiver 1550 above the surface 15.

The adjustable base 1546 can include a sensor (e.g., Hall effect, inductive, capacitive, photoelectric, or ultrasonic sensor) that can measure the adjustment position of the adjustable base 1546. The adjustment position can correspond to a height of the target 1540 and/or light receiver 1550. The sensor can generate a signal to a controller (e.g., controller 1260) and the controller can display the adjustment position through the user interface 1544.

In use, a user can align the light receiver 1550 or gap 1510 with the light plane 32 and adjust the adjustable base 1546 until the target 1540 is supported on the surface. The adjustment position (e.g., height) of the adjustable base 1546 displayed on the user interface 1544 can indicate to a user the levelness of the indicated area of the surface.

In FIG. 16, the gap 1510 of the target 1540 is adjusted to another configuration having a narrower width W2 (e.g., to accommodate a tighter tolerance for surface levelness). The light plane 32 is shown striking the upper reflective member 1514. The upper reflective member 1514 deflects the light plane 32 into the corresponding light receiver 1551. Accordingly the light receiver 1551 can detect that the light plane 32 is striking high on the target 1540 and the surface 15 at that spot is low relative to a reference plane (e.g., reference plane 36). Similarly, the lower reflective member 1512 can deflect the light plane 32 into the lower receiver 1552. In some implementations, the target 1540 can include a self-levelling base 1547.

In FIG. 17, the light plane 32 is split into two streams 32a and 32b by the upper reflective member 1514 (e.g., an outer circumferential edge thereof). The lower stream 32a can enter into the gap 1510 and strike the light receiver 1550. This can induce a first voltage or other measurement parameter of the light receiver 1550. The upper stream 32b can strike the upper light receiver 1551. This can induce a second voltage or other parameter of the upper light receiver 1551. The first and second voltages (or other parameters) can be received by a controller. The controller can compare the voltages to determine an approximate location of the light plane 32 and/or to determine the levelness of the surface 15 to within the desired tolerance. A very high ratio or large difference between the first and second voltages can indicate a higher misalignment of a light plane with the light receiver 1550. A very small ratio or difference between the first and second voltages can indicate a lower misalignment of a light plane with the light receiver 1550. The amount of misalignment can be correlated to the desired tolerance.

FIG. 18 further illustrates the target 1540 with the addition of a spacer 1516. The spacer 1516 can be ring shaped. In certain implementations of the target 1540, the gap 1510 can be adjusted to a width W3 by the removal or addition of the spacer 1516. Optionally the spacer 1560 can be shaped to have an outwardly tapered shape to reflect the light plane 32, similar to the reflective members 1512, 1514. The spacer 1516 can optionally snap onto one or both of the light reflecting members 1512, 1514 or upper or lower portions 1501, 1502.

FIG. 19 shows an embodiment of a floor light projector 1930. The light projector 1930 can include a body 1910 coupled with a base 1934. Optionally the base 1934 is self leveling. The base 1934 can rest on the surface 15 and the body 1910 can be located above the base 1934. The body 1910 can include electronics for powering and controlling a light emitting assembly 1931. The light emitting assembly 1931 of the projector 1930 can include the light emitter 1932. The light emitter 1932 can emit the light plane 32 at a height H above the bottom of the base 1934 and/or surface 15. The light plane 32 can comprising a single wavelength or a band of wavelengths. The light plane 32 can be in the infrared, optical, ultraviolet, or other range of the electromagnetic spectrum. The light source 1930 can be a plane laser emitter.

The light emitting assembly 1931 can be rotatable with respect to the body 1910 and/or base 1934. The rotation of the light emitting assembly 1931 can project the light plane 32 in 360 degrees (or lesser segments thereof) around the light emitter 1930. The height H of the light emitting assembly 1931 and/or body 1910 can be adjustable with respect to the base 1934 and surface 15 by a height-adjustment mechanism 1936. The height-adjustment mechanism 1936 can include a threaded arrangement. The body 1910 can be rotated about the threaded arrangement with respect to the base 1934 and a height of the light plane emitted from the light emitting mechanism 1931 can be adjusted. The height-adjustment mechanism 1936 can include a sensor to measure the height H. The signal generated by the sensor can be received by a controller and the height H can be displayed through a user interface 1920 (e.g., LCD screen).

With reference to FIG. 20, the target 2040 can be a powered target having components and functionality like the targets 1140 or 1540 or the circuits 1240-1440. The target 2040 can include a target body 2048. The target body 2048 can be generally rectangular or block shaped. The target body 2048 can include a light receiver 2050. The light receiver 2050 can be oriented generally vertically on the target body 2048. The light receiver 2050 can detect a location of the light plane 32 striking the sensor 2050.

The body 2048 can include a base 2046. The base 2046 can be self leveling, planar or other base type. The target 2040 can include an indicator assembly 2044. The indicator assembly 2044 can include one or more indicator lights, similar to the indicator lights 1144 of the target 1140 described above, to indicate levelness of a surface (e.g., surface 15).

Certain Terminology

Terms of orientation used herein, such as "top," "bottom," "proximal," "distal," "longitudinal," "lateral," and "end," are used in the context of the illustrated examples. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, as the context may dictate, the term "generally parallel" can refer to something that departs from exactly parallel by less than or equal to 20 degrees.

SUMMARY

Several illustrative examples of leveling systems have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different flowchart, or example. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. Some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some examples, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of leveling systems and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A powered target for use with a planar light source to identify offset areas of a surface relative to a reference plane to within a desired tolerance, comprising:
   an upper portion and a lower portion, the upper and lower portions spaced apart to define a gap therebetween, the upper portion adjustable with respect to the lower portion to adjust a width of the gap, the lower portion configured to rest on the surface with the gap at a height about the surface;
   a light receiver disposed within the gap; and
   at least one indicator light;
   wherein the at least one indicator light is coupled with the light receiver and the at least one indicator light turns on when the light receiver detects a light from the planar light source; and
   wherein the at least one indicator light turned on indicates that the surface is within the desired tolerance.

2. The target of claim 1, wherein the width of the gap is adjustable between 1/32 inches (0.794 mm) and at least 1/4 inches (6.35 mm).

3. The target of claim 1, further comprising a spacer attachable with the upper or lower portions to narrow the gap.

4. The powered target of claim 1, further comprising:
   an adjustment base, the adjustment base configured to adjust the height of the powered target above the surface;
   wherein the adjustment base includes a sensor for measuring the height of the gap above the surface, the height displayed on a user interface.

5. The target of claim 1, further comprising:
   a light reflecting member disposed adjacent to the gap;
   wherein the light reflecting member is configured to deflect the light plane into a second light receiver.

6. The target of claim 5, further comprising a controller, the controller configured to receive a first signal containing a first parameter from the light receiver and a second signal containing a second parameter from the second light receiver and compare the first and second parameters and based on the comparison of the parameters to indicate whether the surface is level to within the desired tolerance; wherein a high ratio of the first parameter to the second parameter corresponds to the surface being within tolerance and a low ratio of the first parameter to the second parameter corresponds to the surface not being within tolerance.

7. The target of claim 1, further comprising a controller coupled with the light receiver and the at least one indicator light, the light receiver configured to generate a signal when the light receiver is struck by the light from the planar light source, the signal received by the controller, the controller configured to turn on the at least one indicator light based on the signal from the light receiver.

8. The target of claim 1, wherein the powered target includes a self-leveling base.

9. The target of claim 8, wherein the self-leveling base is a weighted, dome-shaped protrusion.

10. The target of claim 1, further comprising a level indicator to indicate whether the target is in an upright position on the surface.

11. The target of claim 1, further comprising a speaker for emitting a sound when the light receiver detects the light from the planar light source.

12. The target of claim 1, further comprising a photovoltaic cell for powering at least one indicator light.

13. The target of claim 1, further comprising a sensor configured to measure the width of the gap and generate a signal, the signal received by a controller, the controller configured to generate a display signal, the display signal received by a user interface that indicates the width based on the display signal.

14. The target of claim 1, further comprising a lock that prevents rotation of the upper and lower portions relative to each other to prevent changes to the gap.

15. The target of claim 1, wherein the upper portion and the lower portion are coupled together along a threaded axis.

16. The target of claim 1, wherein the width of the gap corresponds to the desired tolerance for leveling the surface.

17. A powered target for use with a planar light source to identify offset areas of a surface relative to a reference plane to within a desired tolerance, comprising:
   an upper portion and a lower portion, the upper and lower portions spaced apart to define a gap therebetween, the lower portion configured to rest on the surface with the gap at a height about the surface;
   a light receiver disposed within the gap; and
   at least one indicator light;
   wherein the at least one indicator light is coupled with the light receiver and the at least one indicator light turns on when the light receiver detects a light from the planar light source, and the at least one indicator light turned on indicates that the surface is within the desired tolerance.

18. The target of claim 17, further comprising a spacer attachable with the upper or lower portions to narrow the gap.

19. The target of claim 17, further including a self-leveling base.

20. A powered target for use with a planar light source to identify offset areas of a surface relative to a reference plane to within a desired tolerance, comprising:
   an upper portion and a lower portion, the lower portion including a self-leveling base configured to rest on the surface;
   a light receiver disposed at a height about the surface, the light receiver having an exposed thickness in a vertical direction corresponding to the desired tolerance; and
   at least one indicator light;

wherein the at least one indicator light is coupled with the light receiver and the at least one indicator light turns on when the light receiver detects a light from the planar light source; and wherein the at least one indicator light turned on indicates that the surface is within the desired tolerance.

\* \* \* \* \*